(12) United States Patent
Wani et al.

(10) Patent No.: US 7,874,611 B2
(45) Date of Patent: Jan. 25, 2011

(54) SCALABLE TWO-PIECE REINFORCEMENT AND METHOD FOR PRODUCING SAME

(75) Inventors: Tushar Y. Wani, Farmington Hills, MI (US); John P. O'Brien, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 185 days.

(21) Appl. No.: 12/061,683

(22) Filed: Apr. 3, 2008

(65) Prior Publication Data

US 2009/0250969 A1    Oct. 8, 2009

(51) Int. Cl.
   *B62D 25/02* (2006.01)
(52) U.S. Cl. .............................. 296/187.03; 296/203.03
(58) Field of Classification Search ............ 296/187.01, 296/187.03, 187.12, 193.05, 193.07, 203.01, 296/203.03, 204
   See application file for complete search history.

(56) References Cited

U.S. PATENT DOCUMENTS

| | | | | |
|---|---|---|---|---|
| 4,702,515 A | * | 10/1987 | Kato et al. | 296/187.01 |
| 4,848,835 A | * | 7/1989 | DeRees | 296/204 |
| 4,948,196 A | * | 8/1990 | Baba et al. | 296/187.12 |
| 4,966,082 A | * | 10/1990 | Takeichi et al. | 105/422 |
| 7,111,713 B2 | * | 9/2006 | Tamada et al. | 188/371 |
| 7,591,502 B2 | * | 9/2009 | Hedderly | 296/198 |

FOREIGN PATENT DOCUMENTS

| | | |
|---|---|---|
| DE | 19740368 A1 | 3/1999 |
| DE | 102006001061 A1 | 6/2007 |
| EP | 1464547 A1 | 10/2004 |

* cited by examiner

*Primary Examiner*—Glenn Dayoan
*Assistant Examiner*—Melissa A Black
(74) *Attorney, Agent, or Firm*—Quinn Law Group, PLLC

(57) ABSTRACT

A two-piece reinforcement assembly and method for producing the same are provided. The two-piece reinforcement units include first and second half-members, preformed from respective single pieces of material. Assembled two-piece reinforcement units have half-members which are inverted and bonded together. Each of the two-piece reinforcement units includes at least one chamber defined by the bonded half-members. The reinforcement units further include a base portion and an offset portion which are connected by intersection portions on opposing ends of an angular portion. The half-members are bonded at their respective base portions. Each half-member further includes an end portion, which may be substantially perpendicular to the base portion. Further embodiments may include indentations in one of the intersections of the angular portion, and may be tapered along the angular portion from the base portion to the offset portion.

13 Claims, 5 Drawing Sheets

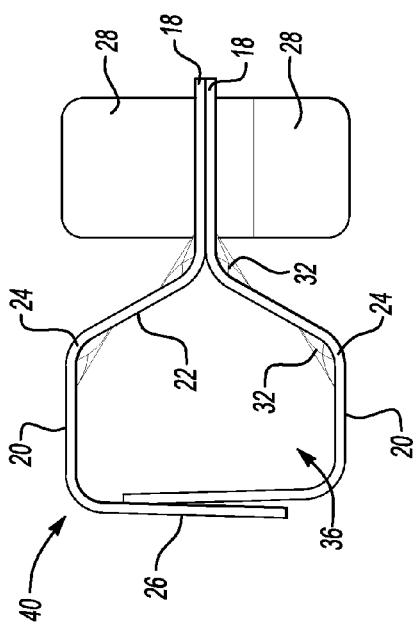
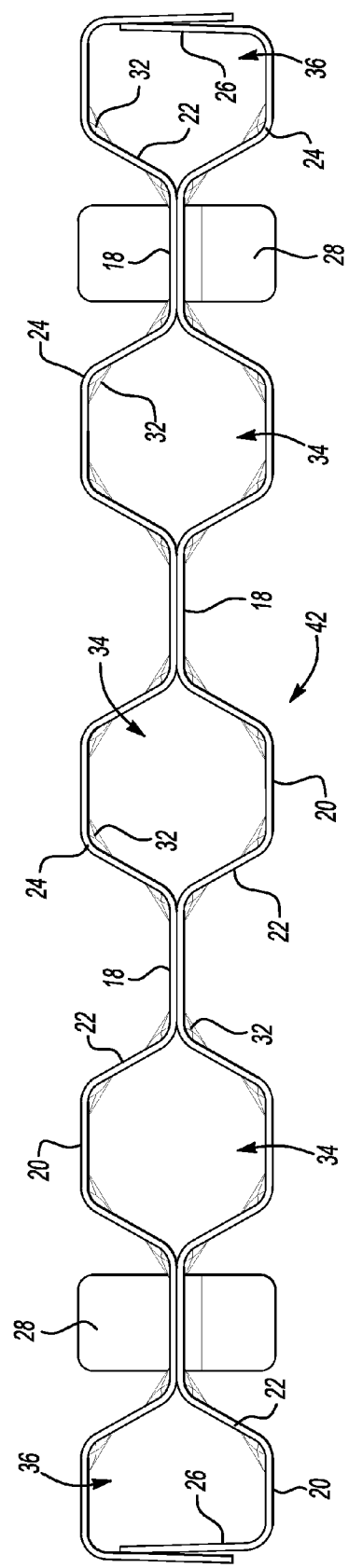

SCALABLE TWO-PIECE REINFORCEMENT AND METHOD FOR PRODUCING SAME

TECHNICAL FIELD

This disclosure relates to devices or structures used to absorb and dissipate energy, and to reinforce and transfer energy to vehicle structure during impact events.

BACKGROUND OF THE INVENTION

Technology geared toward minimization of the effects of impacts on vehicles attempts to absorb and dissipate the energy of an impact through reinforcement structures or assemblies capable of displacing the kinetic force of impact and converting it into work or heat energy. Some methods include adding heavy reinforcement materials to the vehicle structure, which are designed to absorb impact energy.

Impact events transfer varying amounts of energy into different parts of the vehicle structure. Furthermore, impact events often introduce forces along multiple axes and may introduce torsional forces to reinforcement structures. Reinforcement structures may be geared toward resisting the most-probable impact vectors, but may also be capable of dissipating some energy from forces along other vectors.

SUMMARY

A two-piece reinforcement assembly configured to absorb and dissipate energy and to transfer impact energy to vehicle structure is provided. The two-piece reinforcement units are assembled from preformed first and second half-members. Each of the half-members is preformed from a single piece of material and includes substantially identical portions. A base portion and an offset portion are connected by intersection portions on opposing ends of an angular portion. In some embodiments, the base portions and offset portions may be substantially parallel. Each half-member further includes an end portion, which may be substantially perpendicular to the base portion. For application-specific attachment of the two-piece reinforcement unit, a tab portion is provided, which may be substantially perpendicular to the base portion and end portion, and is formed from the same piece of material as its respective half-member. An assembled two-piece reinforcement unit has half-members which are inverted and bonded together, forming one or more chambers.

Further embodiments of the two-piece reinforcement units may include an indentation in at least one of the intersections of the angular portion or portions. To increase the unit depth, some two-piece reinforcement units may taper the angular portion, such as from the base portion to the offset portion. One embodiment of the two-piece reinforcement unit includes half-members having two base portions, three offset portions, two end portions, and two tab portions; which form a hexagonal or honeycomb-like chamber when bonded together.

Full scalability—for reinforcement of areas larger than, or requiring greater reinforcement strength than, an individual reinforcement unit—is achieved by bonding multiple reinforcement units together into reinforcement assemblies. Two or more substantially identical two-piece reinforcement units may be bonded together in myriad configurations to cover and reinforce larger sections of vehicle structure.

A method of producing a scalable reinforcement is also provided. The method comprising providing substantially identical first and second preformed half-members. One of the half-members is then inverted and the two are bonded together to form a first scalable reinforcement unit. The preformed half-members may be created by forming substantially identical first and second patterns from respective pieces of material or blanks, then shaping or forming the patterns into substantially identical half-members. Following a substantially identical process, a second scalable reinforcement unit may be produced, which is then bonded to the first scalable reinforcement unit to form a larger reinforcement assembly.

Each of the individual reinforcement units is highly scalable in terms of outer envelope dimension and of material thickness, and the reinforcement units are combinable to form highly scalable assemblies capable of reinforcing larger sectional areas. The two-piece reinforcement structure includes one or more chambers, which may be hexagonal or partially hexagonal. The scalable two-piece reinforcement unit provides sufficient energy absorption and can be produced with relative ease of manufacture.

The above features and advantages and other features and advantages of the claimed invention are readily apparent from the following detailed description of the best modes and other embodiments for carrying out the invention when taken in connection with the accompanying drawings.

BRIEF DESCRIPTION OF THE DRAWINGS

FIG. 4 is a schematic perspective view of another embodiment of a scalable two-piece reinforcement unit having a single partial honeycomb chamber;

FIG. 5 is a schematic perspective view of another embodiment of a scalable two-piece reinforcement unit having three hexagonal chambers, two partial honeycomb chambers, and four tab portions;

DESCRIPTION OF PREFERRED EMBODIMENTS

Figure 1A:
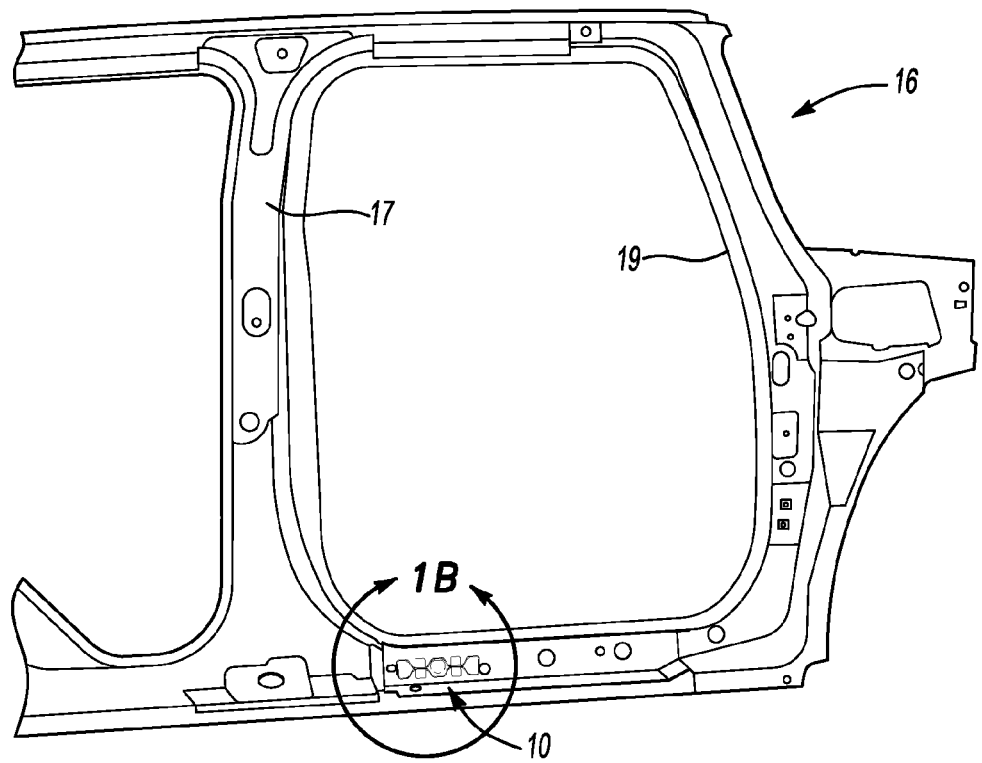
FIG. 1A is a schematic partial side view of an embodiment of a scalable two-piece reinforcement unit, shown in one possible reinforcing application on a vehicle.
Figure 1B:
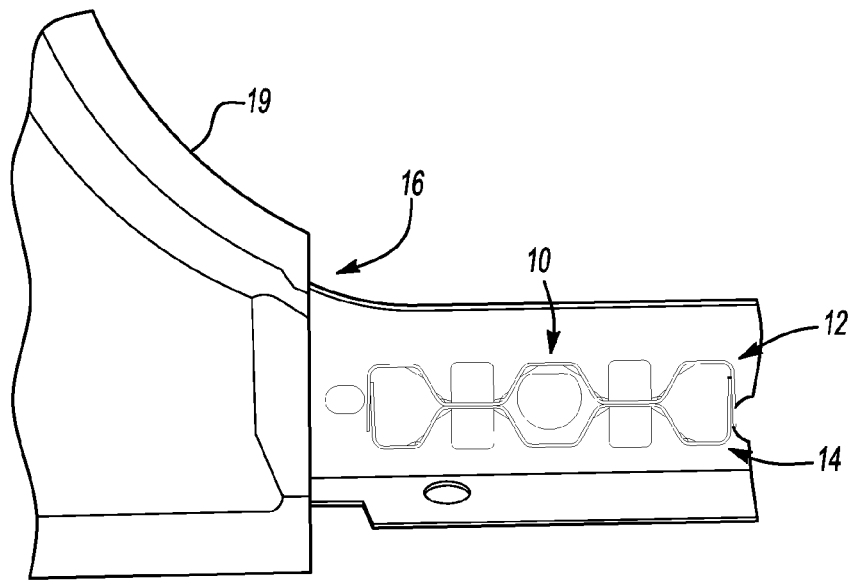
FIG. 1B is a schematic close-up view of the embodiment and application shown in FIG. 1A.

Referring to the Figures, wherein like reference numbers correspond to like or similar components throughout the several figures, there is shown in FIG. 1 an embodiment of a scalable two-piece reinforcement unit 10. In this application of the scalable two-piece reinforcement unit 10, the unit has been placed along the inside face of a side panel 16 of a vehicle body in order to transfer impact to the lower frame structure of the vehicle. The side panel 16 has a B-pillar 17 and a door opening 19. FIG. 1A shows a perspective view of the scalable two-piece reinforcement unit 10 attached to the side panel 16, and FIG. 1B shows a close-up view of the same scalable two-piece reinforcement unit 10. The two-piece reinforcement unit 10 is comprised of two "W" brackets (so-named for their general shape) or half-members, a first half-member 12 and a substantially identical second half-member 14.

Figure 2:
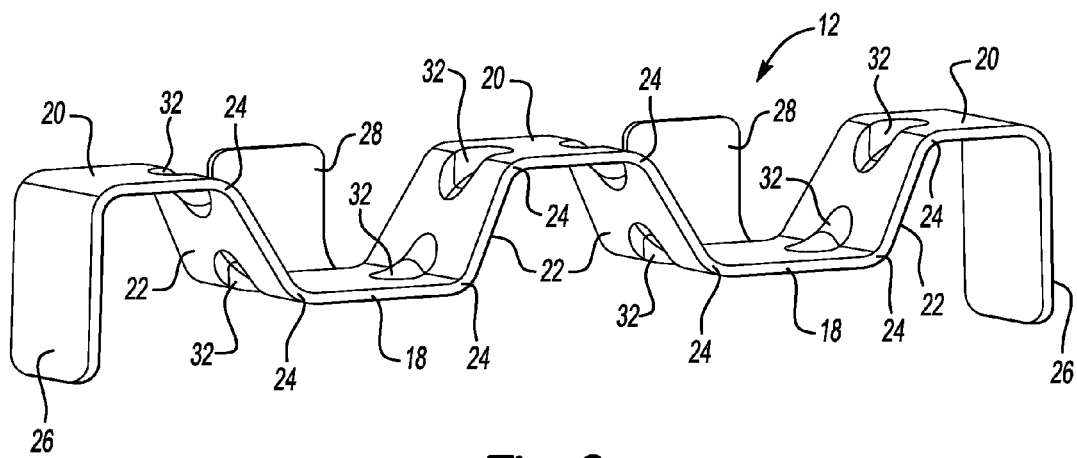
FIG. 2 is a schematic perspective view of one embodiment of a half-member used to create a scalable two-piece reinforcement unit.
Figure 3:
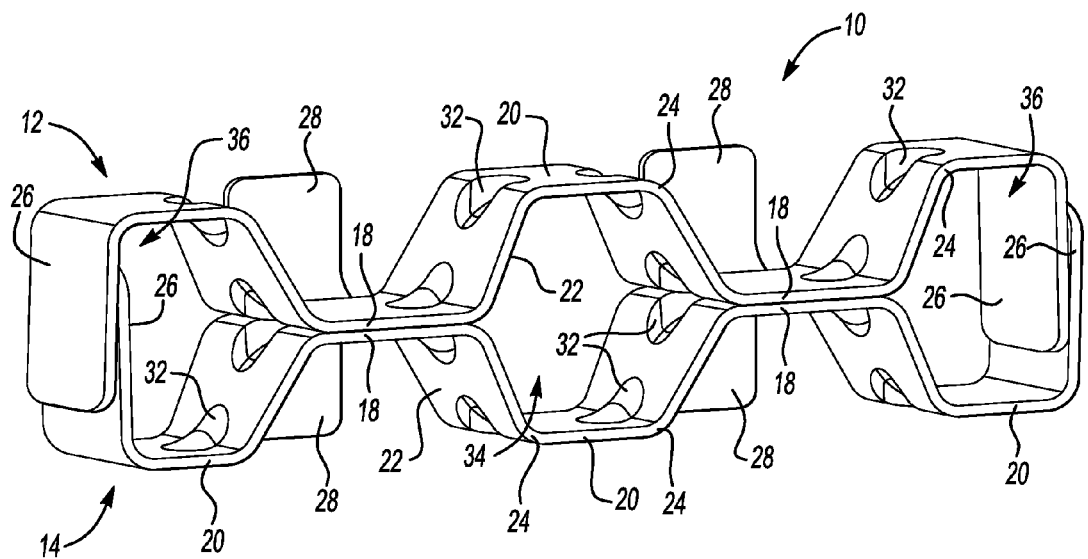
FIG. 3 is a schematic perspective view of the scalable two-piece reinforcement unit created by inverting and bonding two of the half-members shown in FIG. 2.

FIGS. 2 and 3 show the first half-member 12 and the scalable two-piece reinforcement unit 10, respectively, in greater detail. In the embodiment depicted, each of the half-members 12 and 14 is formed from a respective single piece of material or blank. FIG. 2 shows the half-member 12 after a first pattern has been stamped or cut from the blank and then stamped, bent, or otherwise tooled into the final "W" shape of half-member 12. Those having ordinary skill in the art will recognize many methods of creating the half-members from a single piece of material. The pattern created from the blank includes the preformed features which will be shaped into most (or all) of the portions of the final half-member 12. In this embodiment, the first half-member 12 has two base portions 18, which are substantially coplanar along, and define, a base plane. Offset from the base portions 18 (above, as viewed in FIG. 2) are three offset portions 20, which are substantially coplanar. In the embodiment shown, the offset portions 20 are substantially parallel to the base plane.

Connecting the base portions 18 and the offset portions 20 are four angular portions 22. On opposing ends of each of the angular portions 22 are intersection portions 24. Those having ordinary skill in the art will recognize that the size of, and distance between, the base portions 18 and the offset portions 20, and therefore the length and angle of the angular portions 22, may be chosen to adapt the scalable two-piece reinforcement unit 10 for specific applications and purposes.

In the embodiment shown in FIG. 2, on opposing ends of the half-member 12 are two end portions 26 that extend from respective offset portions 20. These end portions 26 may be generally perpendicular to the offset portions 20, allowing the outer envelope of the assembled scalable two-piece reinforcement unit 10 to have a generally rectangular profile. In the embodiment shown, the end portions 26 are not exactly perpendicular in order to facilitate assembly and bonding of the two substantially identical half-members 12 and 14. Generally perpendicular end portions also create an outer surface that may facilitate bonding of the scalable two-piece reinforcement unit 10 to other units in applications requiring scalability (further described below, and shown in FIGS. 7A and 7B).

To facilitate attachment of the scalable two-piece reinforcement unit 10 to vehicle structure, the embodiment of the half-member 12 shown includes tab portions 28 extending from respective base portions 18. These tab portions 28 are coplanar along, and define, an attachment plane. In other embodiments, the tab portions 28 could extend from the offset portions 20 or the end portions 26. Furthermore, in this embodiment, the attachment plane is perpendicular to the base portions 18 (and base plane) and to the end portions 26. Some embodiments may have an attachment plane which is perpendicular to a probable direction of impact.

Referring now to FIG. 3, the second half-member 14 is formed in a substantially similar manner, and has substantially similar structures or portions as the first half-member 12. To assemble the scalable two-piece reinforcement unit 10, the second half-member 14 is inverted about the base plane to be juxtaposed with the first half-member 12. In this configuration, the first and second half-members 12 and 14 combine to create closed polygonal chambers. The base portions 18 of the first and second half-members 12 and 14 are then bonded together to form the scalable two-piece reinforcement unit 10. Those having ordinary skill in the art will recognize many possible methods of bonding half-members 12 and 14, such as, without limitation: welding, adhesives, fasteners, or other methods of bonding.

The overall size and mass, and the material thickness of the scalable two-piece reinforcement unit 10 may vary depending upon the specific requirements and the desired amount of energy dissipation needed in a given sectional area from an individual unit. Those having ordinary skill in the art will recognize that the size and shape of the scalable two-piece reinforcement unit disclosed herein is not limited to the exact configuration and embodiments shown in the figures. In one embodiment, the two "W" brackets form at least one hexagonal-shaped chamber or cell—this cell shape is sometimes referred to as honeycomb.

The embodiment shown in FIG. 3 has a single honeycomb-like hexagonal chamber 34 and two partial honeycomb chambers 36. The offset portions 20, angular portions 22, and end portions 26 cooperate to generally define the partial honeycomb chambers 36; while the offset and angular portions 20 and 22 generally cooperate to define the hexagonal chamber 36. Those skilled in the art will recognize that additional hexagonal chambers—or chambers having other geometric or non-geometric shapes—could be formed within the scope of the claimed invention. As demonstrated in FIGS. 4 and 5, the number of hexagonal chambers 34 formed when the half-members are bonded together may be modified for some applications. FIG. 4 shows an embodiment of a scalable two-piece reinforcement unit 40 having only a single partial honeycomb chamber 36. FIG. 5 shows another embodiment of a scalable two-piece reinforcement unit 42 having three hexagonal chambers 34 and two partial honeycomb chambers 36. The embodiments 40 and 42 in FIGS. 4 and 5 are built from, and retain, many of the same basic elements or portions as the scalable two-piece reinforcement unit 10 in FIGS. 1 and 3.

Hexagonal (honeycomb) structures present better load-bearing characteristics than rectangular or tubular structures. However, in applications where other strength-to-weight ratios are required (such as to present a softer crush zone) other shapes may also be used. Hexagonal structures may also improve the stiffness and ability to dissipate rotational forces (torsion) of the scalable two-piece reinforcement units 10, 40 and 42.

Other possible chamber or cell shapes include, without limitation: rectangular, cylindrical, other polygonal, or even amorphous shapes designed to fit in locations requiring complex contours. One possible embodiment (not shown) could have generally cylindrical chambers. As will be recognized by those having ordinary skill in the art, a cylindrical embodiment retains the base portions 18 and has offset portions 20 transitioning smoothly into the angular portions 22. The indentations 32 could be placed on the intersection portions 24 between the angular portions 22 and base portions 18, and the tab portions 28 would be very similar to the embodiments shown.

Figure 6A:
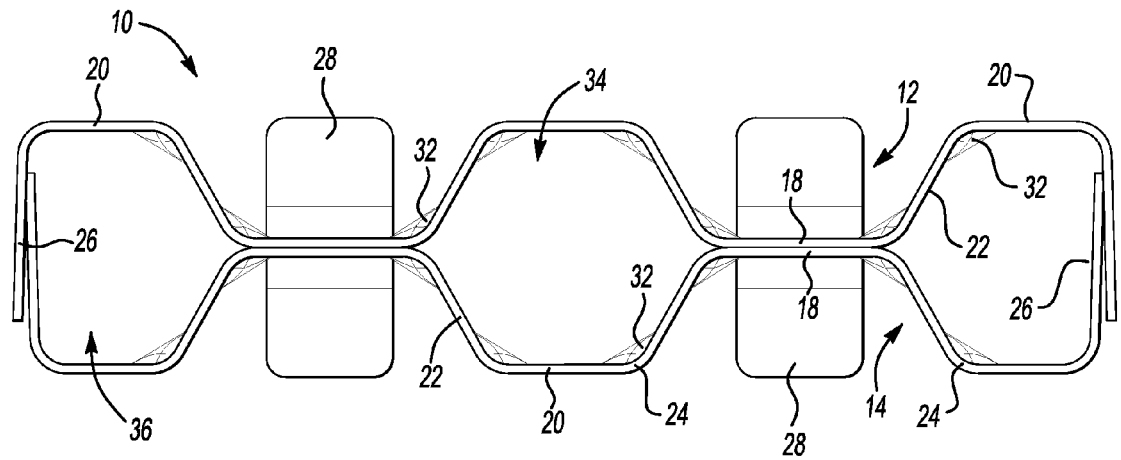
FIG. 6A is a schematic front view of an embodiment of a scalable two-piece reinforcement unit.
Figure 6B:
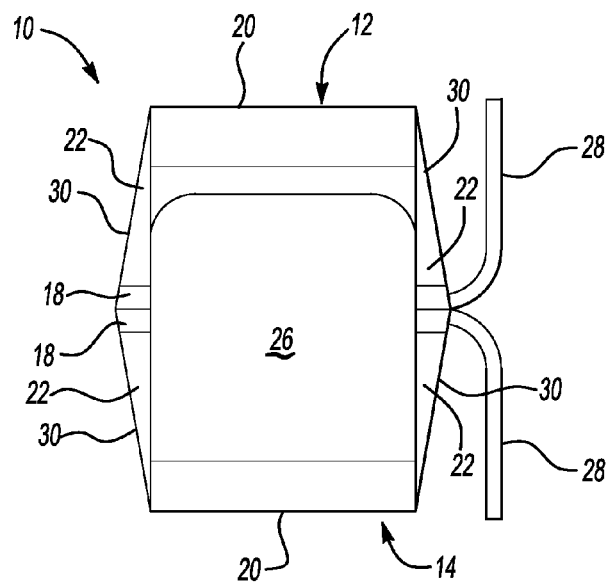
FIG. 6B is the schematic side view of the embodiment shown in FIG. 6A, showing that this embodiment has a taper feature from the base portions to the offset portions.

FIGS. 6A and 6B show an embodiment of the scalable two-piece reinforcement unit 10 from front and side view perspectives, respectively. Depending upon the application, the scalable two-piece reinforcement unit 10 may be oriented to absorb impact from any direction. One application orients the unit to absorb impact from a direction parallel to the base plane and perpendicular to the attachment plane (going into, or coming out of, the orientation shown in FIG. 6A).

In one embodiment, the scalable two-piece reinforcement unit 10 has an approximate width of 176 millimeters, height of 40 millimeters, and depth of 38.5 millimeters. The outer envelope dimensions of the embodiments described in relation to FIGS. 6A and 6B are approximate. Those skilled in the art will recognize that the scalable two-piece reinforcement unit 10 may be made in much smaller and much larger sizes, depending upon the application.

Orienting the scalable two-piece reinforcement unit 10 for a probable direction of impact perpendicular to the attachment plane maximizes the total strength of the structure, and does so with reduced mass per unit of energy required to crush or otherwise deform the structure, as compared to other orientations. Furthermore, this allows the tab portions 28 to be used as attachment interfaces and bonded to the vehicle structure without subjecting the bonds to shear loads during impact. Note that while this impact-perpendicular orientation maximizes the strength of the scalable two-piece reinforcement unit 10, in some applications, this may not be desirable. Specific applications may require less strength from reinforcement structures, which could be achieved by changing the reinforcement orientation. For any given energy dissipation and impact absorption goal, the orientation (in addition to size, material thickness, and geometry) may be individually tailored.

As seen in FIG. 6B, some embodiments of the scalable two-piece reinforcement unit 10 include a tapered side profile 30. Tapering allows the scalable two-piece reinforcement unit 10 to fill a larger gap between the point of impact and underbody structure, increases the energy dissipated as the unit crushes, and does so with relatively little added mass.

The embodiment shown in FIG. 6B is tapered from the base portions 18 to the offset portions 20; the base portions 18 are wider than the offset portions 20, and thus the angular portions 22 are tapered. However, other embodiments may include a taper that is larger at the offset portions 20 and reduces depth in the middle (as viewed in FIG. 6B) at the base portions 18.

As may be best viewed in FIGS. 2 and 3, one embodiment of the scalable two-piece reinforcement unit 10 includes an indentation 32 on some or all of the intersection portions 24. The indentations 32 are impressions bent, stamped, or otherwise formed into the half-members 12 and 14. Indentations 32 have a generally cylindrical or arc-shaped cross section, and smooth, rounded or filleted transitions from the surrounding portions or walls. Radial transitions reduce the risk of increasing stress concentrations—as compared to sharp corners or jagged edges—that could cause localized fractures in the material of the scalable two-piece reinforcement unit 10 during loading. Radial transitions may further ease the manufacturing process by simplifying the shaping process, especially where die stamping is used to produce the half-members 12 and 14.

Indentations 32 act first as stiffeners by reducing the ability of the unit to twist and buckle. The indentations also act as crush initiation points: areas that are locally weakened and at which the scalable two-piece reinforcement unit 10 begins to deform when subjected to a predetermined stress. Once loads exceed critical levels in the scalable two-piece reinforcement unit 10, it may be beneficial for the unit to crush or crumple rather than to retain its original shape. The indentations 32 therefore allow the scalable two-piece reinforcement unit 10 to absorb more energy while holding its general shape and configuration, and then allow the unit to further dissipate energy by becoming a crush zone. As the wall material of the scalable two-piece reinforcement unit 10 folds and bends, energy is dissipated in the form of heat, because plastic deformation of the material itself requires energy.

Those having ordinary skill in the art will recognize that choice of the material for creating the scalable two-piece reinforcement unit 10 will be based upon several factors, and that the "W" bracket half-members 12 and 14 are themselves highly scalable in terms of thickness and width. Design parameters factored into material selection include, without limitation: the dimensions of the space desired to be reinforced by a single unit or assembly of units, the energy dissipation needs, the probable impact force vectors, and the difficulty of manufacturing the specific configuration of the half-members. The embodiment shown in FIGS. 6A and 6B uses high strength dual phase steel, at a material thickness of approximately 1.5 millimeters.

Figure 7A:
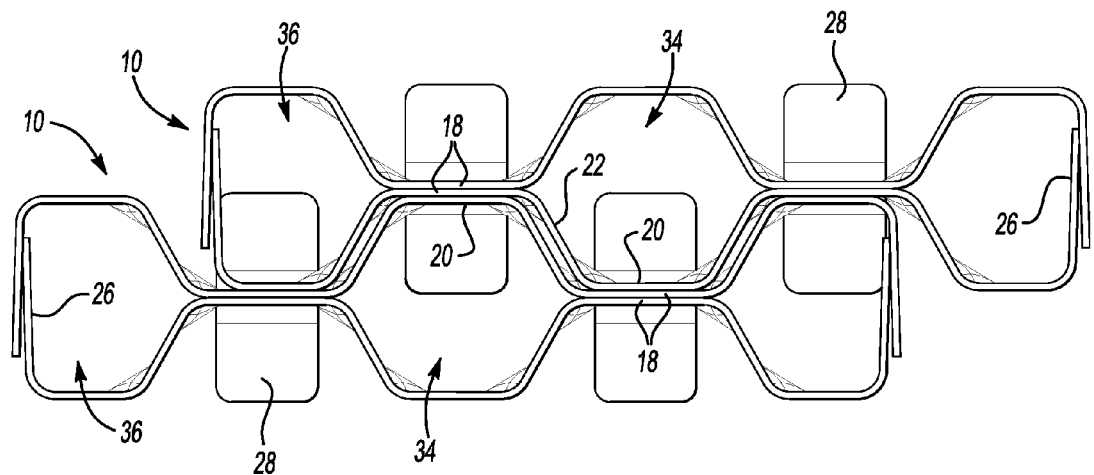
FIG. 7A is a schematic front view of an assembly of two scalable two-piece reinforcement units combining wall thicknesses to increase strength and cover a larger sectional area.
Figure 7B:
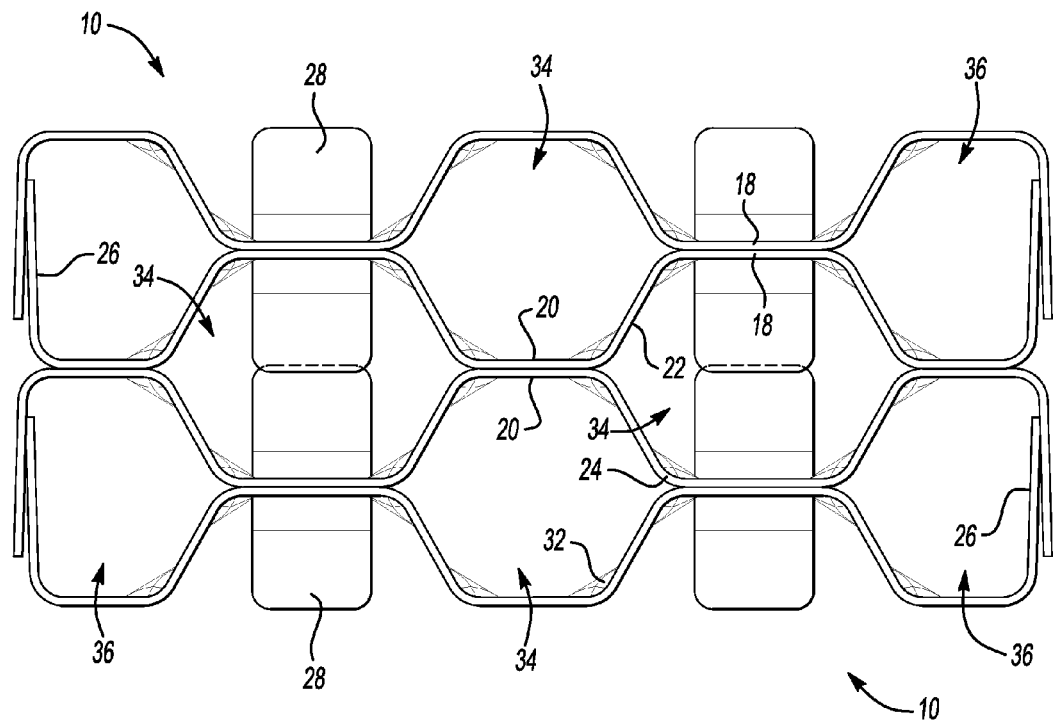
FIG. 7B is a schematic front view of another assembly of scalable two-piece reinforcement units assembled to maximize the sectional area covered by two reinforcement units, and combining to create additional hexagonal chambers.

In order to expand usability as an impact energy dissipation device in many types of vehicles, some embodiments—such as that shown in FIGS. 6A and 6B—of the scalable two-piece reinforcement unit 10 are capable of being scaled or combined into reinforcement assemblies covering larger impact areas. Multiple, substantially identical scalable two-piece reinforcement units 10 are manufactured and then combined into application-specific assemblies for myriad vehicle applications. After creating third and fourth half-members, a second scalable two-piece reinforcement unit 10 is formed and then bonded to the first unit. As shown in FIGS. 7A and 7B, two or more scalable two-piece reinforcement units 10 may be nested or stacked and bonded together to form assemblies of varying size and strength.

In the assembly shown in FIG. 7A, base portions 18 of one unit 10 are bonded to the offset portions 20 of the second unit 10. This embodiment creates interior structural walls having three times the thickness of the base material, and therefore improves strength in addition to covering a larger sectional area. In the assembly shown in FIG. 7B, the offset portions 20 of each unit have been bonded together. This embodiment fully expands (in regard to an assembly having only two scalable two-piece reinforcement unit 10) the overall size and cross section of the assembly to reinforce a larger area. Both of the assembly embodiments shown in FIGS. 7A and 7B retain and repeat the hexagonal honeycomb structure throughout. While assemblies using only two scalable two-piece reinforcement units 10 are shown, those having ordinary skill in the art will recognize not only that these assemblies can further be scaled by adding additional units, but that further configurations and bonding patterns may be utilized.

A method of producing scalable two-piece reinforcement units 10 and scaling the units into reinforcement assemblies is also provided. As described above, the method comprises creating the first pattern—having the as yet unformed features of the half-members—from a first piece of material, and shaping that first pattern into a first "W" bracket or first half-member 12. One embodiment of the first pattern would look similar to the first half-member 12 shown in FIG. 2, but unfolded into a flat sheet. The two half-members 12 and 14 are then inverted and bonded together to form a first scalable two-piece reinforcement unit 10. Substantially identical processes may be used to create additional reinforcement units, which are then bonded together to create assemblies.

While the best modes, and other modes, for carrying out the invention have been described in detail, those familiar with the art to which this invention relates will recognize various alternative designs and embodiments for practicing the invention within the scope of the appended claims.

The invention claimed is:

1. A reinforcement assembly, comprising:
   a first half-member preformed from a first piece of material;
   a second half-member substantially identical to said first half-member, preformed from a second piece of material;
   wherein said substantially identical first and second half-members each include:
      at least one base portion;
      at least one offset portion;
      at least one angular portion connecting said at least one base portion and said at least one offset portion wherein said at least one angular portion tapers from said at least one base portion to said at least one offset portion; and
      at least one end portion;
   wherein said second half-member is inverted and said first and second half-members are bonded together, such that said first and second half-members define at least one chamber;
   wherein said at least one base portion of said first half-member is bonded to said at least one base portion of said second half-member;
   wherein said substantially identical first and second half-members further include an indentation at an intersection of said angular portion and one of said base portion and said offset portion;
   wherein said substantially identical first and second half-members further include at least one tab portion perpendicular to said at least one base portion and said at least one end portion; and
   wherein said at least one end portion is substantially perpendicular to said at least one base portion.

2. A reinforcement assembly, comprising:
   first and second half-members, preformed from respective pieces of material and each including:
      two substantially coplanar base portions defining a base plane;
      three offset portions spaced apart from and substantially parallel to said base plane;
      four angular portions, connecting said base portions and said offset portions at intersection portions on opposing ends thereof; and
      two end portions substantially perpendicular to said base plane;
   wherein one of said first and second half-members is inverted about said base plane, and said base portions of said first half-member are bonded to said base portions of said second half-member to form a first reinforcement unit;
   wherein said first reinforcement unit includes three chambers.

3. The assembly of claim 2, wherein said first half-member and said second half-member are tapered from said base plane to said offset plane.

4. The assembly of claim 3, further comprising an indentation at one of said intersection portions of said angular portions and said base portions.

5. The assembly of claim 4, wherein said first and second half-members further include two substantially coplanar tab portions, defining an attachment plane substantially perpendicular to said base plane and said two end portions.

6. The assembly of claim 5, further comprising:
   third and fourth half-members preformed from respective pieces of material, substantially identical to said first and second half-members;
   wherein one of said third and fourth half-members is inverted about said base plane of said third and fourth half-members, and said base portions of said third half-member are bonded to said base portions of said fourth half-member to form a second reinforcement unit; and
   wherein said first reinforcement unit and said second reinforcement unit are bonded together such that said attachment planes are parallel.

7. The assembly of claim 2, further comprising an indentation at one of said intersection portions of said angular portions and said base portions.

8. A reinforcement assembly, comprising:
   first and second half-members, preformed from respective pieces of material and each including:
      two substantially coplanar base portions defining a base plane;
      three offset portions spaced apart from and substantially parallel to said base plane;
      four angular portions, connecting said base portions and said offset portions at intersection portions on opposing ends thereof; and
      an indentation at one of said intersection portions of said angular portions and said base portions;
   wherein one of said first and second half-members is inverted about said base plane, and said base portions of said first half-member are bonded to said base portions of said second half-member to form a first reinforcement unit;
   wherein said first reinforcement unit includes three chambers.

9. The assembly of claim 8, further comprising a plurality of indentations, wherein at least one of said plurality of indentations is located at each one of said intersection portions of said angular portions and said base portions.

10. The assembly of claim 9, wherein said first and second half-members further include two end portions substantially perpendicular to said base plane.

11. The assembly of claim 10, wherein said first half-member and said second half-member are tapered from said base plane to said offset plane.

12. The assembly of claim 9, wherein at least one of said plurality of indentations is located at each one of said intersection portions of said angular portions and said offset portions.

13. The assembly of claim 12, wherein said first and second half-members further include two substantially coplanar tab portions, defining an attachment plane substantially perpendicular to said base plane and said two end portions.

* * * * *